Nov. 14, 1950     R. F. WILD     2,530,109
MEASURING AND CONTROLLING APPARATUS
Filed Jan. 2, 1947     4 Sheets-Sheet 2

*INVENTOR.*
RUDOLF F. WILD
BY Arthur H. Swanson
ATTORNEY

Nov. 14, 1950

R. F. WILD 2,530,109

MEASURING AND CONTROLLING APPARATUS

Filed Jan. 2, 1947

*INVENTOR.*
RUDOLF F. WILD

BY Arthur H. Swanson

ATTORNEY

Nov. 14, 1950   R. F. WILD   2,530,109
MEASURING AND CONTROLLING APPARATUS
Filed Jan. 2, 1947   4 Sheets-Sheet 4

FIG. 6

INVENTOR.
RUDOLF F. WILD
BY Arthur H. Swenson
ATTORNEY

Patented Nov. 14, 1950

2,530,109

UNITED STATES PATENT OFFICE 2,530,109

MEASURING AND CONTROLLING APPARATUS

Rudolf F. Wild, Philadelphia, Pa., assignor, by mesne assignments, to Minneapolis-Honeywell Regulator Company, Minneapolis, Minn., a corporation of Delaware Application January 2, 1947, Serial No. 719,746

18 Claims. (Cl. 175—320)

The present invention relates to measuring and control apparatus including a measuring circuit network producing a signal voltage varying with changes in the quantity measured, an electronic voltage amplifying and motor drive system in which said signal is amplified, and a reversible motor automatically operated by said system to effect operations for control purposes, and usually for both control and measuring purposes on changes in the quantity measured. The general object of the present invention is to provide measuring and control apparatus of the general character above mentioned with relatively simple and effective means for producing control effects in normal operation which are selectively dependent on the quantity measured and operating, without regard to the value of the quantity measured, to insure safe failure of the apparatus in the event of an operative failure of one or another of various elements of the apparatus.

A specific and practically important object of the present invention is to provide a self-balancing potentiometric measuring apparatus for effecting on-off control, with simple and effective means for effecting an upscale adjustment of the slider contact of the potentiometer circuit on the detection of an apparatus failure.

In my Patent No. 2,452,023 of October 19, 1948, I have disclosed and claimed improved self balancing potentiometric measuring and control apparatus of the above mentioned character and of the well known conversion type, in which the input and output circuits of the voltage amplifying and motor drive system are coupled to produce high frequency oscillations which are utilized to insure safe failure of the apparatus when certain elements of the apparatus become defective or inoperative. A primary object of the present invention is to improve and extend the field of use of the invention disclosed in said prior application by providing simple and effective means for utilizing high frequency oscillations produced by coupling the input and output circuits of the amplifying and motor drive system in effecting on-off control, as well as to insure safe failure of the apparatus when elements thereof become inoperative.

A more specific object of the invention is to provide apparatus of the above mentioned character with mechanism automatically actuated by the reversible motor on predetermined changes in the value of the quantity measured from the normal or control point value of the quantity to regulate or control the production of high frequency oscillations utilized in effecting on-off control.

In one form of the invention, the mechanism automatically actuated when the thermocouple temperature varies between its normal or control point value and a lower value operates, when so actuated, to vary the effectiveness of the feed back coupling between the input and output circuits of the electronic amplifying and motor drive system. In another form of the invention, I combine a self balancing potentiometric measuring apparatus of the conversion type with a feed back coupling to produce high frequency oscillations which insure safe failure, and with a second oscillating system capable of operation to produce oscillations of higher frequency than the first mentioned oscillations. The last mentioned form of the invention preferably includes a movable vane or induction shield, and means for adjusting it in response to variations in the value of the quantity measured, and adapted by its adjustment to vary the mutual inductance of windings included in the second oscillating system to thereby initiate and interrupt oscillation of the latter. The character of the combination is such that the operation of said second oscillating system is possible only when the first mentioned high frequency oscillations are being produced, and then only when the value of the quantity measured is below its normal value.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
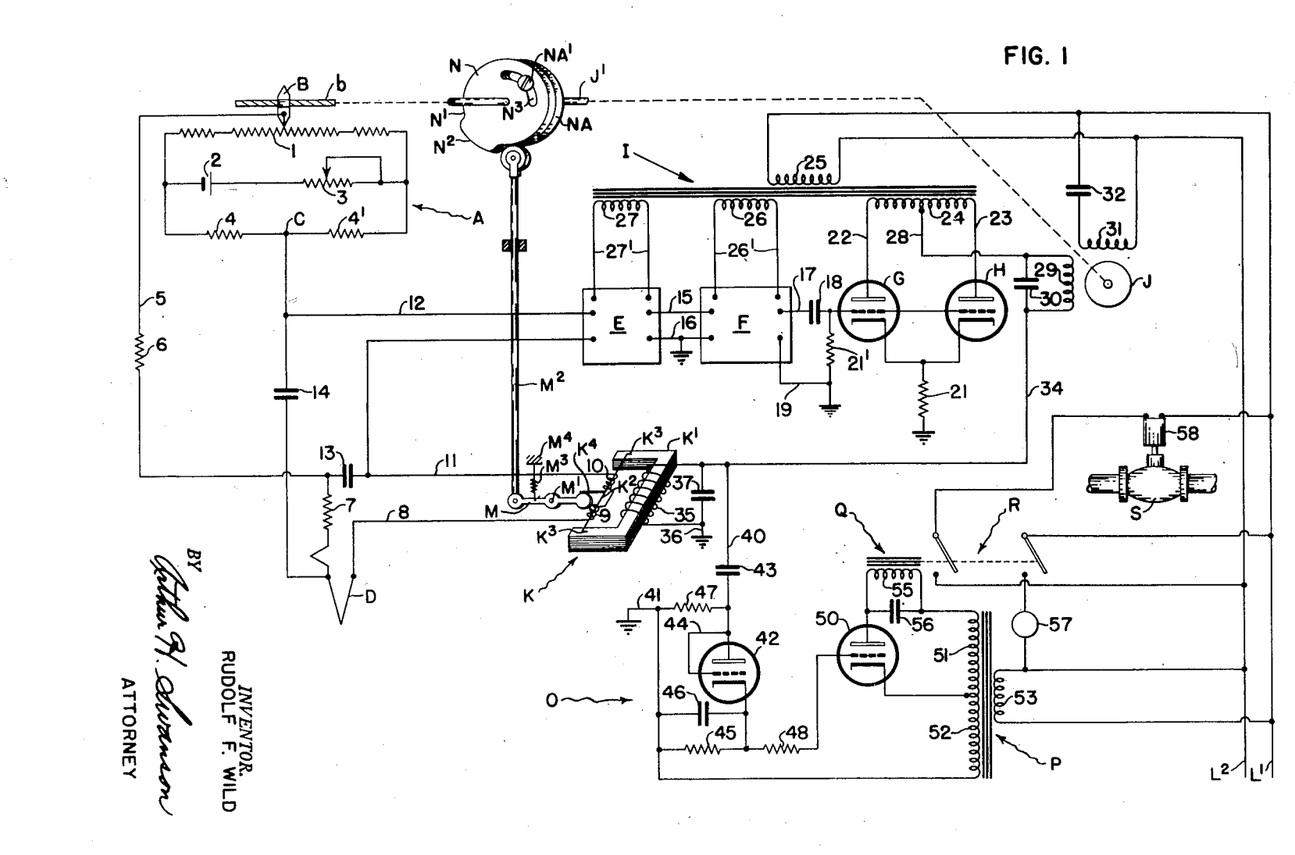
Fig. 1 is a diagrammatic representation of self balancing potentiometric apparatus including one form of my improved means for producing a control action on the failure of the apparatus elements.

In Fig. 1 I have illustrated a safe failing, on-off control pyrometer embodiment of my invention, normally operative to close or open a furnace fuel supply valve S in response to a predetermined increase or decrease in furnace temperature, and to insure the closure of the valve S during periods in which any one of certain elements or portions of the pyrometer is operatively defective. The potentiometer shown in Fig. 1 comprises self balancing potentiometric measuring apparatus of the well known conversion type combined with relatively simple means for producing, detecting and utilizing high frequency oscillations in accordance with the present invention. The measuring apparatus includes a bridge circuit A having a branch including a slide wire resistor 1, a branch including an energizing battery 2 and an adjustable resistance 3, and a branch including resistors 4 and 4'. The first and third mentioned branches are connected in parallel with one another, and each in series with the other branch. The slide wire resistance 1 is engaged by a slider contact B which is adjusted longitudinally of the resistance by a feed screw or shaft b in threaded engagement with the contact, rotated by a reversible rebalancing motor J which has its rotor shaft connected by an element J' to the feed screw b.

The bridge circuit A forms part of a measuring circuit network which also comprises a measuring circuit branch connected between the slider contact B and the junction point C of the bridge resistors 4 and 4', and including a thermocouple D. The slider contact B is connected to one terminal of the thermocouple D by a conductor 5 and resistors 6 and 7. The second terminal of the thermocouple D is connected to the bridge point C by a conductor 8, coils 9 and 10, the input conductor 11 of a conversion element E, and the second input conductor 12 of the element E. The circuit elements 7, D, 8, 9 and 10 are shunted by a condenser 13. The terminal of the thermocouple D to which the resistor 7 is directly connected, is connected by a condenser 14 to the bridge point C.

In the normal operation of the measuring apparatus shown in Fig. 1, the voltage of the thermocouple D is opposed to the potential drop in the potentiometer bridge circuit between the slider contact B and fixed bridge point C. When said potential drop is equal to and balances the thermocouple voltage, the measuring system is balanced. When the temperature of the thermocouple D increases or decreases, the resultant rise or fall in the thermocouple voltage unbalances the measuring system, and the conversion element E then initiates a rebalancing operation of the motor J. In that operation the motor J adjusts the slider contact B into a new position along the slide wire resistance 1, in which the potential drop between the slider contact B and the fixed bridge point C again becomes equal and opposite to the thermocouple voltage, thereby rebalancing the system. Thus in the arrangement shown in Fig. 1, current flow through the input circuit of the element E initiates a rebalancing operation of the motor J which is continued until it effects an interruption of said current flow.

As shown diagrammatically, the element E controls the operation of the motor J through a voltage amplifier F and power drive triodes G and H, as the rebalancing motor is controlled in the standard conversion type potentiometer, wherein the voltage amplifier is a three stage electronic amplifier including an amplifying triode valve in each stage, and a rectifier valve supplying plate current to said triode valves. The output terminals of the converter E are connected by conductors 15 and 16 to the input terminals of the amplifier F. As shown, one output terminal of the amplifier F is coupled by a conductor 17 and condenser 18 to the control grids of the triodes G and H. The second output terminal of the amplifier F is connected to ground by a conductor 19, and the cathodes of triodes G and H are also connected to ground through a common bias resistor 21. A grid resistor 21' connects the grids of the triodes G and H to ground in the usual manner.

Anode current is supplied to the valves G and H through conductors 22 and 23 connected to the opposite ends of the secondary winding 24 of a transformer I, which has two other secondary windings 26 and 27, and has a primary winding 25 connected across supply conductors L' and L². The latter may be included in an ordinary alternating current distribution system, and are assumed herein to supply current at about 115 volts with a frequency of 60 cycles per second, though other frequencies and voltages may be employed. The secondary winding 26 is connected by conductors 26' to the amplifier F to energize the rectifier therein. The secondary winding 27 supplies energizing current through conductors 27' to an alternating current vibrator, or circuit interrupter forming a part of the conversion element E. The midpoint of the transformer secondary winding 24 is connected to ground through a conductor 28, the control winding 29 of the motor J and a condenser 30 connected in parallel to the winding 29, a conductor 34 and the hereinafter described winding 35, condenser 37 and ground connection 36. The motor J includes a power winding 31 which is connected across the supply conductors L' and L² in series with a condenser 32.

In the normal measuring operation of the apparatus shown in Fig. 1 and hereinbefore described, measuring circuit unbalance results in a unidirectional current flow in one direction or the other direction through the input circuit of the conversion element E. On such current flow the element E operates to create an alternating voltage in phase with or 180° out of phase with the voltage across the supply conductors L' and L², accordingly as the unidirectional current flow through the thermocouple D and input circuit of the element E is in one direction or the other. The direction of the unidirectional current flow is dependent, of course, on whether the voltage drop between slider contact B and fixed point C of the bridge point, exceeds, or is less than, the voltage of the thermocouple D.

The phase of the alternating current signal introduced in the output circuit of the element E and amplified in the amplifier F and then applied to the control grids of the valves G and H through the conductor 17 and condenser 18 determines the resultant direction of operation of the motor J. The direction of rotation of the motor depends directly upon which of the valves G and H passes the larger amount of alternating current of 60 cycle frequency to the motor control winding 29. It is assumed herein that the motor J will operate to adjust the slider contact B upscale or downscale accordingly as the effective current flow through the valve H exceeds, or is less than, the effective current flow through the valve G. On that assumption, the phase of the signal transmitted to the control grids of the valves G and H through the conductor 17 for upscale motor drive will be that required to make the control grid of the valve H positive during the half cycle in which the end of the transformer winding 24 connected to the conductor 23 is positive relative to the end of the winding connected to the conductor 22.

Insofar as above described, and except for the coils 9, 10, and 35 the apparatus shown diagrammatically in Fig. 1, is well known and is a typical example of the commercial conversion type potentiometer which it is the special object of the present invention to improve. The conversion type potentiometer is disclosed and claimed in the Wills Patent No. 2,423,540, granted July 8, 1947 on an application, filed December 1, 1941, and is also disclosed in the Wills Patent No. 2,385,481, of September 5, 1945, and further reference herein to the form and operation of the means diagrammatically illustrated for controlling the normal operation of the motor J are therefore unnecessary.

The coils 9 and 10 in the measuring circuit branch of the circuit network collectively form the secondary winding of a coupling transformer K having a primary winding 35 and provided for the purposes of the present invention. The transformer K so couples the input and output circuits of the electronic amplifying and motor drive system as to create high frequency oscillations when the apparatus is intact and the temperature of the thermocouple D is below its control point or normal value. The oscillations thus created are detected by a detector circuit O, and the latter actuates control and signal apparatus in selective accordance with the existence or non-existence of the high frequency oscillations. The winding 35 has one terminal 34 connected to the terminals of the motor control winding 29 and condenser 30 remote from the transformer secondary winding 24. The second terminal 36 of the coil 35 is connected to ground, and the two terminals of the coil 35 are connected by a condenser 37.

The transformer K comprises a core structure including a U shaped laminated iron body portion K', and an iron wire portion $K^2$ having its ends $K^3$ attached to the legs of the laminated body portion K'. A transverse arm $K^4$ is rigidly attached to the wire $K^2$ midway between the ends of the latter. The yoke of the U shaped body portion K' is surrounded by the convolutions of the primary winding 35, and the convolutions of the coil 9 surround the portion of the wire $K^2$ at one side of the arm $K^4$ and the convolutions of the coil or winding 10 surrounds a portion of the wire $K^2$ at the opposite side of the arm $K^4$. The ends $K^3$ of the wire $K^2$ are so attached to the body portion of the core structure that the wire is subjected to torsional stress, and preferably so that the wire is under longitudinal tension. For the purpose of the present invention, a mechanical connection between the arm $K^4$ and the slider B is provided so that as the temperature of the thermocouple D falls below its normal value, the resultant movement of the slider contact B will turn the arm $K^4$ about the axis of the wire $K^2$. Such turning movement of the arm $K^4$ increases the torsional stress in the portion of the wire $K^2$ at one side of the arm and surrounded by one of the coils 9 and 10, and reduces the torsional stress in the portion of the wire at the other side of said arm, and surrounded by the other of said coils.

The above mentioned mechanical connection between the arm $K^4$ and slider contact B comprises a lever M and thrust rod $M^2$, having one end pivoted to the lever M, and a cam element N suitably secured to the feed screw $b$ and engaging the second end of the rod $M^2$. The lever M is pivoted at M', and has one end pivotally connected to one end of the rod $M^2$, and has its other end in position to engage and turn the arm $K^4$ about the axis of the wire $K^2$ when the rod $M^2$ is moved away from the feed screw $b$ by the cam N. As shown, the rod $M^2$ is held in engagement with the edge of the cam element N at all times by a spring $M^3$ acting between the lever M and a stationary part $M^4$. When the temperature of the thermocouple D is at or above its normal value, the adjacent end of the rod $M^2$ engages a portion N' of the edge of the element N which extends circularly about the axis of the feed shaft $b$, and the angular position of the lever M is then such to impress no turning force on the arm $K^2$. When the temperature of the thermocouple D falls below its normal value, the resultant angular adjustment of the feed shaft $b$ and cam element N causes an edge portion $N^2$ of the element N, of greater radial extent than the portion N', to engage the rod $M^2$ and move the latter longitudinally away from the axis of the shaft $b$. Such movement of the rod $M^2$ tilts the lever M and gives an angular adjustment to the arm $K^4$.

Control point adjustment of the apparatus shown in Fig. 1 may be effected by the adjustment of the cam element N angularly about the shaft or feed screw $b$, so as to change the position of the slider contact B along the resistance I occupied when the cam portion $N^2$ operatively engages the upper end of the rod $M^2$. Such adjustment of the cam N may be obtained by releasably clamping the element N to a disc NA rigidly attached to the feed screw $b$, with the element and disc in different relative angular adjustments. To this end, the cam N is rotatably mounted on the shaft $b$ and is formed with an arc shaped slot $N^3$ through which extends a clamping screw NA' threaded into the disc NA. When the screw NA' is loosened, the cam N may be turned on the shaft $b$.

With the wire $K^2$ subjected to initial torsion as above described, the effect of the angular adjustment of the arm $K^4$ is to increase the torsional stress to which one half portion of the wire is subjected. That half portion is assumed herein to be the portion of the wire $K^2$ extending through the coil 9. At the time at which the torsional stress in the portion of the wire $K^2$ surrounded by the coil 9 is thus increased, the torsional stress to which the half of the wire extending through coil 10 is diminished. The coils 9 and 10 are so formed and connected that when both halves of the wire $K^2$ are subjected to the same torsional stress, the voltage induced in the coil 9 by the current flow through the coil 35 is equal and opposite to the voltage then induced in the coil 10. In consequence, when thermocouple D is at or above its normal temperature, the coupling connection, including the transformer K, is inoperative to produce high frequency oscillations in the circuit network.

It is known that the magnetic reluctance of a body of magnetic metal is decreased by subjecting the body to mechanical stress. In consequence when the temperature of the thermocouple D falls below its normal value, and the lever M angularly adjusts the arm $K^4$, the magnetic reluctance of the portion of the wire surrounded by the coil 9 is decreased, and the reluctance of the portion of the wire surrounded by the coil 10 is increased. This results in magnetic leakage, making the magnetic flux in the portion of the wire $K^2$ surrounded by the coil 9 greater than in the portion of the wire $K^2$ surrounded by the coil 10. When the voltages induced in the coils 9 and 10 are thus made unequal, the coupling including the core structure K and coils 9, 10 and 35, becomes effective to produce high frequency oscillations in the circuit network if the latter is in good condition. Such oscillations can be detected and utilized to produced control effects in various ways, one of which is illustrated in Fig. 1.

During those periods in which the arm K⁴ is deflected by the lever M, the apparatus shown in Fig. 1 operates like the apparatus disclosed in my prior application to produce high frequency oscillations. During those periods the voltage of the coil 9 exceeds the opposing voltage of the coil 10, and the two collectively form an operative secondary winding for the transformer K. The latter then operatively couples the output and input circuits of the electronic amplifying system, and transfers energy from the output circuit to the input circuit as required for the maintenance of an oscillating current flow. The frequency of that current is determined by the parameters of the coupled circuits in conjunction with the characteristics of the amplifying and motor drive system. For the purposes of the present invention, the previse frequency of the high frequency oscillation current produced as described, is not critical. Advantageously, however, it is of the order of 15–20 kilocycles, in which frequency range the amplifier gain is considerably lower than it is in its normal operating range of 60 cycles. Consequently, the high frequency oscillation will not overload the amplifier, nor significantly interfere with the available amplifier output.

With the standard amplifying and control system included in the apparatus diagrammatically shown in Fig. 1, the high frequency oscillating current can ordinarily be maintained during alternating half cycles only of the 60 cycle alternating supply voltage used in energizing the power stage of the system. This is due to the fact that the phasing of the transformer included in the conversion element E changes during each half cycle and one phase only is suitable for generation of high frequency signals, though if the amplitude of the feed back signal is excessively great, high frequency oscillations may be produced during each half cycle. In ordinary operation, however, the high frequency oscillations are produced in intermittent bursts or series recurring with a frequency of 60 cycles per second and with each burst or series continuing for not more than 1/120 of a second.

So long as the transformer K remains continuously operative as a coupling transformer, the high frequency oscillating current flow is continuously maintained, regardless of whether the measuring system is balanced or unbalanced. With the arrangement shown in Fig. 1, however, the transformer K can be operative only during periods in which the temperature of the thermocouple D is below its normal or control point value. During periods in which the transformer K is operative and the measuring system is unbalanced, the high frequency oscillations ride through the amplifying system on any 60 cycle signal of normal amplitude then being impressed on the amplifying and control apparatus by the conversion element E as a result of the unidirectional current flow in the input circuit of that element. Those skilled in the art will understand how to relatively proportion and arrange the windings and core of the transformer K, and the capacitance and resistance values of the circuit elements determining the oscillation frequency. It is noted in this connection that the resistance 7 is provided for damping purposes, and resistance 6 is employed to minimize the effect of changes in resistance in the potentiometer circuit between the point C and contact B as the latter is moved along the slide wire resistance 1.

The high frequency signal is clipped or interrupted as a result of cut-off and/or saturation of the plate current in the final stage of the three stage amplifier F, on and as a result of an abnormal increase in the 60 cycle signal produced by the development of any one of the following operative defects: namely, an abnormal increase in the measuring system resistance, the failure of any of the voltage amplifier valves, or the development of a defect in the control system causing any one of the amplifying tubes to be overdriven. Furthermore, any mechanical failure of the motor J, preventing the latter from rotating, will soon interrupt the high frequency current as the resultant measuring circuit unbalance increases, so that a 60 cycle voltage signal will then be impressed on the amplifier which is large enough to over-drive any one of the amplifier tubes.

While the apparatus shown in Fig. 1 is operative to produce high frequency oscillations only during periods in which the voltage of the thermocouple D is below its normal or control point valve, the high frequency detection circuit O and associated control elements P, Q, R and S shown in Fig. 1 cooperate at all times to prevent an unsafe failure of the apparatus as will be explained.

The detector system or circuit, shown in Fig. 1, comprises input terminals 40 and 41. The terminal 40 is connected to the terminal 34 of the primary winding 35 of the transformer K. The terminal 41 is grounded and thereby connected to the grounded terminal 36 of the coil 35. The terminal 40 connects the corresponding terminal of the winding 35 to the anode of an electronic valve 42 through a condenser 43. The valve 42 is shown as a triode having its anode and control grid connected by a conductor 44. The cathode of the valve 42 is connected to ground through a high resistance 45 which may be of 2 megohms, and a condenser 46 in parallel with said resistance. A resistance 47 connects the anode and control grid of the valve 42 to ground. The condenser 43 and resistance 47 cooperate to form a filter minimizing the amount of 60 cycle signal amplification reaching the valve 42. To this end, the condenser 43 may have a capacitance of 2500 mmf., and the resistance 47 may be of 10,000 ohms. The capacity of the condenser 46 may be 0.05 mf. The cathode of the valve 42 is connected through a resistance 48, which may have a value of 0.25 megohms, to the control grid of a triode 50. The valves 42 and 50 may be included in a twin tube of the commercially available 7N7 type.

The plate circuit of the valve 50 includes the secondary winding 51 of a power transformer P, which has another secondary winding 52, and has its primary winding 53 connected to the 60 cycle supply conductors L' and L². One terminal of the secondary winding 51 is connected to the cathode of the valve 50. The secondary winding 52 is employed to apply an alternating voltage to the cathode of the valve 50 to vary the voltage of said cathode relative to the ground potential, and to the potential of the control grid of the valve 50. The transformer secondaries 51 and 52 may well develop voltages of 225 and 12 volts, respectively. The plate circuit of the valve 50 includes in series with the transformer secondary winding 51, the winding 55 of an electromagnetic relay Q. As shown, a condenser 56 which may be of 8 mf. capacity, is connected in shunt to the winding 55. When the relay Q is suitably energized, it moves a two pole control switch R into its closed position. The switch R is biased for movement into its open position when the relay Q is not operatively energized.

As diagrammatically shown, the movement of the switch R into its closed position closes a signal circuit including a lamp or other signal element 57, and closes a separate control circuit which includes the winding 58 of the control device S. Both of said circuits are opened when the switch R moves into its open position. Each circuit when closed is connected across the supply conductors L' and L². As diagrammatically shown, the control device S is a valve which may be connected in the fuel supply pipe for the furnace having its temperature measured by the thermocouple D.

In the contemplated use of the measuring and control apparatus shown in Fig. 1, a reduction in the temperature of the thermocouple D below the normal or control point value of the temperature, results in an angular adjustment of the arm $K^4$, effected through the elements N and $N^2$, $M^2$ and M, which increases the permeability of the portion of the wire surrounded by the coil 9 and increases the magnetic reluctance of the portion of the wire surrounded by the winding 10. This makes the coils 9 and 10 collectively operative as a secondary winding of the transformer K and results in the production of high frequency oscillations, which are amplified in the voltage amplifier F and are transmitted to the input terminals 40 and 41 of the detection circuit O. The resultant plate current flow through the valve 42 raises the potential of the control grid of the valve 50 relative to the cathode potential of that valve and thus energizes the relay Q and closes the switch R. The closure of that switch energizes the signal 57 and energizes the control valve winding 58. This results in an adjustment of the control valve S and a corresponding increase in the fuel supply to the furnace, to the temperature of which the thermocouple D is responsive.

With the on-off control contemplated, the normal effect of the adjustment of the fuel valve S effected by the energization of the relay Q is a progressive increase in the temperature to which the thermocouple D is responsive, which continues until the thermocouple temperature has returned to its normal value. The resultant return of the slider contact B to its control point position is accompanied by a rotation of the cam element N, which moves the cam edge portion $N^2$ out of engagement with the rod $M^2$. Thereupon, the bias spring $M^4$ moves the lever M into a position in which it permits the angular adjustment of the arm $K^4$ required to equalize the torsional stresses in the portions of the wire $K^2$ at opposite sides of the arm. Such equalization results in the equalization of the opposing voltages induced in the windings 9 and 10, and thus interrupts production of the high frequency oscillations.

The Fig. 1 apparatus has two operating characteristics of primary importance. One is the operative dependence of the transformer K on the position of the slider contact B along the slide wire 1, so that the high frequency oscillating current flow can be maintained only during periods in which the temperature of the thermocouple D is below its normal or control point value, and then only if the apparatus is free from hereinbefore mentioned operative defects. The second of said salient characteristics is the opening of the control switch R and of the fuel valve S at all times except when high frequency oscillations are being impressed on the input terminals 40 and 41 of the detection circuit O, and cause the latter to effect the energization of the relay Q.

The apparatus shown in Fig. 1 thus provides protection against unsafe failure at all times, since the valve S can be opened only during periods in which high frequency oscillations are being produced, and those oscillations cannot be produced during periods in which any of the previously mentioned operative defects of the apparatus exist.

The general principles of the present invention may be utilized and its general advantages attained with apparatus in which the adjustment of the slider contact B of Fig. 1 to the lower side of its normal value or control point position, effects control adjustment of a fuel control device like, or analogous to, the device S, through means quite different from those shown in Fig. 1 for producing and utilizing high frequency oscillations.

Figure 2:
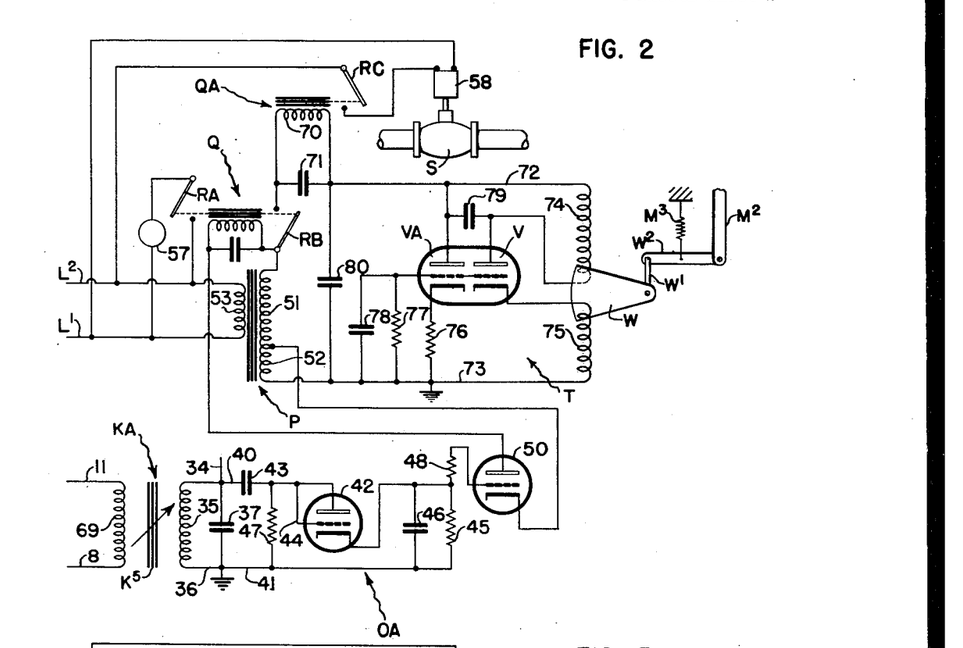
Figs. 2 and 3 are diagrams each illustrating a different modification of the oscillation producing and detecting portions of the apparatus shown in Fig. 1.

Thus, as diagrammatically illustrated in Fig. 2, self balancing measuring apparatus including means to produce high frequency oscillations and generally like the apparatus shown in Fig. 1, may be used to prevent unsafe failure by permitting or preventing the energization of a second high frequency oscillating circuit T through which on-off control is effected. The circuit T when energized is adjusted to effect on-off control by a device mechanically connected to the slider contact B of the measuring apparatus. The energization of the second oscillation circuit T is directly effected and interrupted by a detection circuit OA generally like the circuit O of Fig. 1, accordingly as high frequency oscillations are or are not impressed on the input terminals 40 and 41 of the circuit OA.

The means for producing the high frequency oscillations transmitted to the detection circuit OA of Fig. 2 may be exactly like those shown in Fig. 1 for impressing high frequency oscillations in the circuit O, except for differences between the coupling transformer K of Fig. 1 and the coupling transformer KA of Fig. 2. The transformer KA has a single secondary winding 69 of conventional form and need not differ from an ordinary transformer though advantageously and as shown, the magnetic core $K^5$ of the transformer KA is adjustable to vary the mutual inductance of the primary and secondary windings of the transformer. The transformer KA of Fig. 2 is continuously operative to transfer energy from its amplifier and motor drive output circuit, which includes conductors 34 and 36 like those shown in Fig. 1, to the input circuit including conductors 8 and 11 like those of Fig. 1. In consequence, a high frequency oscillation voltage is continuously impressed on the input terminals 40 and 41 of the circuit OA of Fig. 2, so long as the measuring and motor drive apparatus is intact and in operation. The occurrence of a thermocouple break, or the development of any other apparatus defect of a character preventing the production of high frequency oscillations in the apparatus shown in Fig. 1, prevents the energization of the relay Q.

The detector circuit OA is associated with a power transformer P and relay Q in Fig. 2, as in Fig. 1. The relay Q of Fig. 2 operates when energized to close two switches RA and RB, each of which is biased to its open position and moves into the latter when the relay Q is deenergized. The closure of the switch RA closes a signal circuit including a signal device 57. The latter may be like the device 57 of Fig. 1, and may be similarly included in a signal circuit energized by the supply conductors L' and L².

The closure of the switch RB, which can occur only when the measuring and control apparatus is in condition to produce high frequency oscillations, energizes the circuit T and thereby enables the latter to energize and deenergize an electromagnetic relay QA when the temperature of the thermocouple D or other controlling quantity respectively falls below or rises to its normal or control point value.

The circuit T is especially suitable and desirable for its use illustrated in Fig. 2, because of its high stability and sensitivity. With the switch RB closed the transformer secondary windings 51 and 52 are connected in series with one another and with the switch RB and the winding 70 of the relay QA and condenser 71 in shunt with said winding to maintain a 60 cycle voltage difference between conductors 72 and 73, the conductor 73 being connected to ground. The conductors 72 and 73 are included in the plate circuits of two triode valves V and VA connected in parallel with one another. The valves V and VA may both be included in a twin tube of the 7N7 type. The valve V does or does not oscillate, depending on the position of a vane W which depends on the temperature of the thermocouple D. The anode of the valve V is connected to the conductor 72 through a coil 74, and its cathode is connected to the grounded conductor 73 through a coil 75. The valve VA, which is not intended to oscillate at any time, has its anode directly connected to the conductor 72. The cathode of the valve VA is connected to the conductor 73 through a bias resistor 76. The control grids of the two valves are connected to the grounded conductor 73 through a resistor 77 and a by-pass condenser 78 in parallel with said resistor. The anodes of the valves V and VA are connected by a condenser 79, and a condenser 80 is connected between the conductors 72 and 73.

As diagrammatically shown, the coils 74 and 75 in the plate circuit of the valve V are arranged end to end in good mutual inductance relation, but with a space between the coils adapted to be entered by the movable control element W. The latter, as shown, is a vane formed by a sector shaped sheet of metal of good conductivity, such as copper or aluminum. At one end the vane W is attached to a transverse rock shaft W' which may be turned to move the vane W transversely to the axis of the coils 74 and 75 so as to vary the mutual inductance of said coils. The arm W² is connected to the shaft W' at one end and is pivotally connected at its other end to a rod M², similar to the rod M² of Fig. 1 and similarly associated with the cam N secured to the feed shaft b of Fig. 1.

The vane W is formed and disposed and adjusted by the rod M², relative to the coils 74 and 75, and the latter and other components of the circuit T are proportioned and arranged so that when the temperature is at or above the control point and the the upper end of the rod M² engages the edge portion N' of the cam N, shown in Fig. 1, the vane W allows the mutual inductance of the coils 74 and 75 to cause oscillation of the valve V. When the thermocouple temperature falls below normal and the rod M² passes out of engagement with the edge portion N' and into engagement with the edge portion N² of Fig. 1, the vane W prevents the coils 74 and 75 from having sufficient mutual inductance to cause the valve V to oscillate. The oscillation frequency of the valve V is approximately the resonance frequency of the tuned circuit portion formed by the coil 74 and condenser 79 and may well be 30 megacycles or so.

The condenser 80 prevents the high frequency oscillation current produced by the valve V from passing through the relay winding 70. When the vane W is in position in which it prevents oscillation of the valve V, the 60 cycle anode currents flowing through the valve V and VA are collectively great enough to operatively energize the winding 70 of the relay QA, but when the valve V is oscillating, the 60 cycle current flowing through the winding 70 is too small to operatively energize the winding 70. When the winding 70 of the relay QA is operatively energized, the switch RC is moved from the open position, to which it is biased, into a position in which it connects the winding 58 of the electromagnetic fuel valve S across the supply conductors L' and L², thereby opening the valve S.

The effect of the ground connection to the control grids of the valves V and VA formed by the resistor 77 and condenser 78, is to maintain those grids continuously at the ground potential for the high frequencies at which the oscillator operates. With the cathode of the valve V connected to ground through the coil 75, and with the anode of the valve V connected to ground through the coil 74 and condenser 80, and with the cathode of the valve VA connected to ground through the bias resistor 76, the potential difference between the control grid and the cathode of each of the valves V and VA varies as a result of variations in the potential difference between that cathode and ground. Oscillation of the valve V is created and maintained by the transfer of energy from the output to the input circuits of the valve V by virtue of the coupling between the coils 74 and 75. The capacity of that coupling to transfer energy depends upon and is controlled by the mutual inductance of the coils 74 and 75. Their mutual inductance is varied by the adjustment of the vane W.

Advantageously, the circuit elements are so proportioned and arranged that with one edge of the vane W in one position in which it is in close proximity to the common axis of the coils 74 and 75, the valve V will not act as an oscillator, but when said vane edge is moved into a second position minutely further away from said axis, the valve V will act as an oscillator. When the valve V is acting as an oscillator, the oscillation circuit includes the cathode of the valve V, coil 75, conductor 73, condenser 80, coil 74 and condenser 79 in parallel therewith, and the anode of the valve V.

While the valve V is, and the valve VA is not, in the oscillation circuit, the circuit connections to the two valves are such that the performance of each exercises a certain controlling effect upon the performance of the other. When the valve V is oscillating, the average D. C. grid bias on that valve is negative with respect to its associated cathode, due to the flow of grid current through the resistor 77. Due to the action of the condenser 78 the D. C. bias on the control grid of the valve V is substantially constant while that valve is oscillating. Owing to the direct connection of the control grid of the valve V to the control grid of the valve VA, the oscillation of the valve V and resultant flow of grid current through the resistor 77 makes the control grid of the valve VA more negative relative to the cathode of the valve VA than it is when the valve V is not oscillating. The oscillation of the valve V thus limits the low pulsating frequency current flowing in series through the valve VA and through the relay winding 70 and condenser 71 in parallel with that winding.

When an adjustment of the vane W interrupts the oscillation of the valve V, the low frequency current flow through the valve VA is increased, being then controlled by the cathode bias of the valve VA which is due to the current flow through the resistor 76. That cathode bias makes the control grid of the valve VA less negative relative to the cathode of the valve than does the potential drop through the resistance 77 occurring when the valve V is oscillating. The low frequency plate current flow through the valve V created by the power transformer P does not create any appreciable or significant bias effect on the valve V because the cathode inductance coil 75 has a practically negligible low frequency resistance.

The high frequency current flow through the valve V produces an alternating voltage across the cathode coil 75 which is degenerative in character, but is not really a bias voltage. That alternating voltage varies with the high frequency oscillation current and may be regarded as a degenerative high frequency signal impressed on the input circuit of the valve V. The degenerative effect of the high frequency voltage developed across the cathode inductance coil 75 when the valve V is oscillating, neutralizes a portion of the regenerative high frequency voltage induced in the coil 75 by the coil 74, and thus contributes directly to a reduction in the movement of the vane W required to establish and interrupt oscillation of the valve V. The valve VA contributes to the stability of operation of the control system shown in Fig. 2, and to a reduction in the extent of the movement of the vane W necessary to establish and interrupt oscillation of the valve V by reducing the amount of low frequency relay energizing current which the valve V must furnish to produce the relay operation effected when the valve V is not oscillating.

The special oscillating circuit T shown in Fig. 2 is disclosed and claimed in the application of Wm. S. Wannamaker, Jr., bearing Serial No. 694,401, filed August 31, 1946.

Figure 3:
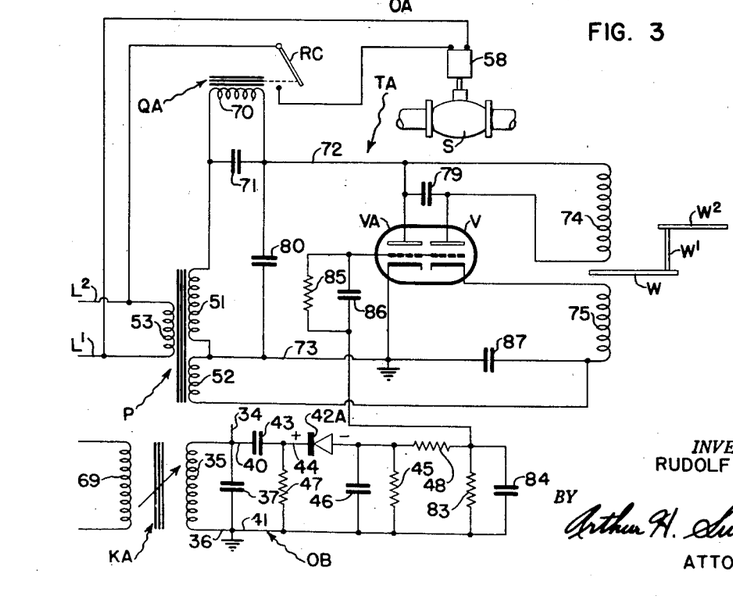

In Fig. 3 I have illustrated a modification of the apparatus shown in Fig. 2 which comprises a detector circuit OB and an oscillating circuit TA generally like the circuits OA and T, respectively, of Fig. 2. The circuit OB comprises elements which correspond respectively to the elements 42–48 of Fig. 2 and are similarly designated, except that the electronic rectifier valve 42 of Fig. 2 is replaced in Fig. 3 by a crystal detector 42A. In Fig. 3 the terminals of the resistances 45 and 48 are directly connected to one another, and are indirectly connected by a resistance 83 and a condenser 84 in parallel with the resistance 83, and forming a filter for radio frequency currents. In operation with the measuring and control apparatus in such operative condition that radio frequency oscillations are impressed on the input terminals 40 and 41 of the circuit OB, unidirectional positive pulses of $1/120$ second duration are produced across the resistor 83. These positive pulses are applied to the control grids of the valves V and VA of the circuit TA through a resistor-capacitor combination comprising a resistor 85 and a condenser 85 in parallel with said resistor which are connected between the control grids of the valves V and VA and the junction point of the resistances 48 and 83 of the circuit OB.

The resistance 85 and capacitor 86 replace the resistance 77 and condenser 78 which connect the control grids of the valves V and VA to the grounded conductor 73 in Fig. 2. The circuit TA also differs from the circuit T of Fig. 2 in that in Fig. 3 the transformer secondary 52, in series with the coil 75, is connected between the conductor 73 and the cathode of the valve V, and for radio frequencies the cathodes of the valves V and VA are connected to each other by a condenser 87. The coil 52 of the transformer is thus operative to impress a 60 cycle voltage on the cathode circuit of the valve V which is so phased and of such magnitude as to prevent the combined currents of the valves V and VA from rising to a value sufficiently high to operatively energize the relay QA and close the contact RC, even though the valve V is not oscillating, except during periods in which the detector circuit OB is impressing the above mentioned positive impulses through the resistor 85 and capacitor 86 on the control grids of the valves V and VA. Thus, when high frequency oscillations are impressed on the input terminals of the detector circuit OB, the positive pulses impressed on the control grids of the valves V and VA through the resistance 85 and condenser 86 during the half cycles that the amplifying and motor drive system is oscillating may substantially counteract the effect of the voltage impressed on the cathode circuit of the valve V by the transformer secondary 52, so that the circuit operates as if those 60 cycle voltages were not present.

In operation, therefore, when the measuring and control apparatus becomes defective so that high frequency oscillations are not impressed on the input terminals of the detector circuit OB, and positive pulses are not applied by that circuit to the control grids of the valves V and VA, the current flow through the coil 70 of the relay QA is reduced sufficiently to permit the switch RC to open and thus prevent unsafe operation of the apparatus.

The circuit shown in Fig. 3 omits the relay Q, switches RA and RB, and signal device 57 of Fig. 2, and replaces the vacuum tube 42 of Fig. 2 by a simple crystal detector 42A, with no loss of functional capacity, except the capacity to furnish a visual indication of apparatus failure such as is furnished by the signal lamp 57 of Fig. 2.

Figure 4:
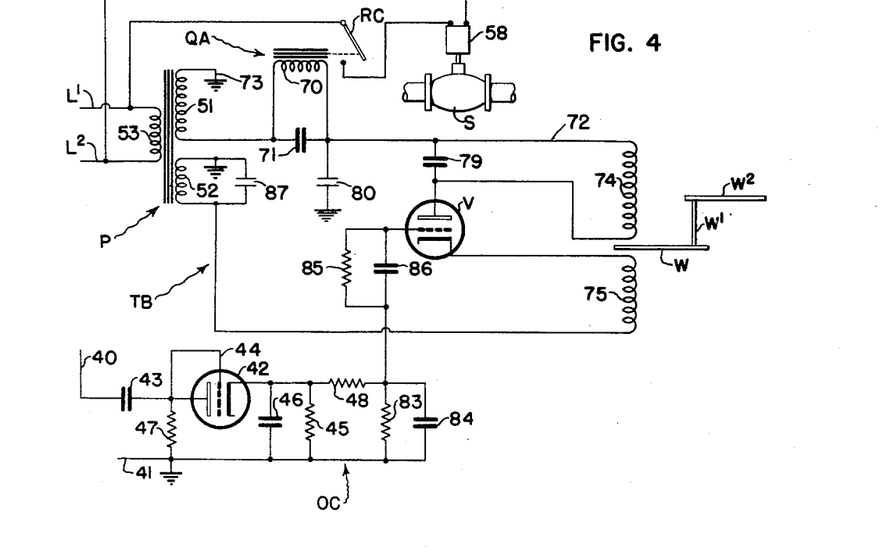
Fig. 4 is a diagram illustrating a modification of the apparatus shown in Fig. 3.

In Fig. 4 I have illustrated a modification of the apparatus shown in Fig. 3, characterized by the omission from the oscillating circuit TB of the non-oscillating valve VA of Fig. 3. The detector circuit OC of Fig. 4 differs from the detector circuit OB of Fig. 3 in that the crystal detector 42A of Fig. 3 is replaced by a valve 42 like the valve 42 of Fig. 2. The replacement of the crystal detector 42A by the electronic valve 42 is not essential to the operativeness of the apparatus shown in Fig. 4, but is convenient since the valve 42 and the valve V of Fig. 4 may be included in a single twin tube such as the commercially available 7N7 tube. The operation of the circuit shown in Fig. 4 is essentially the same as that of the apparatus shown in Fig. 3, but the omission of the valve VA from the circuit shown in Fig. 4 results in some loss of sensitivity.

As will be apparent, the fundamental difference between the vane controlled circuit shown in Fig. 2 and those shown in Figs. 3 and 4, is that the circuit shown in Fig. 2 includes a switch RB which opens the second oscillating circuit when a defect in the measuring and amplifying apparatus prevents high frequency signals from being impressed on the input terminals 40 and 41 of the detector circuit OA. In Figs. 3 and 4, the switch RB can be omitted because the vane controlled circuits TA and TB are so formed and arranged as to be inherently inoperative in the absence of positive pulses which cannot be transmitted to them from the detector circuits OB and OC, respectively, when the measuring and amplifying system shown in Fig. 1 is not in fully operative condition.

Figure 5:
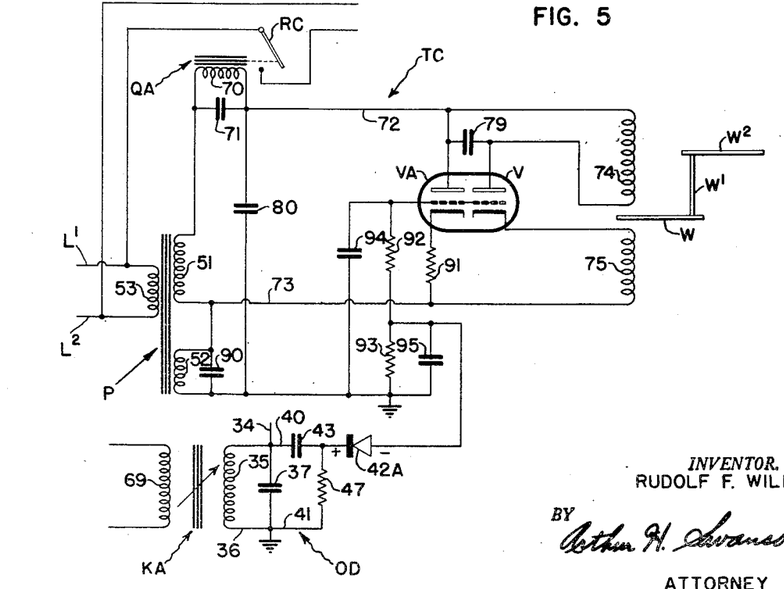
Fig. 5 is a diagram illustrating another modification of the apparatus shown in Fig. 3.

The form of the invention illustrated in Fig. 5 differs significantly from the form illustrated in Fig. 3 only in the form of the detection circuit, and in the biasing provisions for the valves V and VA. The detection circuit OD of Fig. 5 omits the circuit elements 45, 46, 48, 83 and 84 included in the detection circuit OB of Fig. 3.

The oscillating circuit TC of Fig. 5 differs from the circuit TA of Fig. 3 in a number of respects, relating to the biasing provisions associated with the valves V and VA. In Fig. 5 the conductor 73 is connected to ground through the secondary winding 52 of the transformer P and the condenser 90 in parallel with said secondary. In Fig. 5, the conductor 72 is connected by the condenser 80 to the grounded terminal of the secondary winding 52. In Fig. 5 the cathode of the oscillating valve V is connected by the inductive winding 75 directly to the conductor 73, and is thereby connected to the cathode of the valve VA through the bias resistor 91, connecting the last mentioned cathode to the conductor 73. The control grids of the valves V and VA of Fig. 5 are connected to ground by resistors 92 and 93 in series with one another and by the condenser 94 connected in parallel with said series connected resistors. A condenser 95 is connected in parallel with the resistor 93. The negative terminal of the rectifier 42A of the detector circuit OD is connected to the junction point of the resistors 92 and 93.

I now regard the arrangement shown in Fig. 5 as practically preferable to the arrangements shown in Figs. 2, 3 and 4. Satisfactory operating results have been obtained with an arrangement of the kind shown in Fig. 5, having resistor and condenser values as follows:

Resistance of resistor 47 is 10.000 ohms
Resistance of resistor 91 is 500 ohms
Resistance of resistor 92 is 50,000 ohms
Resistance of resistor 93 is 500,000 ohms
Capacity of condenser 71 is 8 microfarads
Capacity of condenser 79 is 5 micromicrofarads
Capacity of condenser 80 is .005 microfarad
Capacity of condenser 94 is .015 microfarad
Capacity of condenser 95 is .015 microfarad The secondary winding 52 applies a 10 volt, 60 cycle biasing voltage to the cathodes of both valves V and VA. The phase of said biasing voltage relative to the plate voltages is such that the cathodes of the valves go positive whenever the anodes go positive. In operation, the intermittent bursts of high frequency oscillations impressed on the detector input conductors 40 and 41 of Fig. 5, produce a pulsating unidirectional voltage of positive polarity across the half-megohm resistor 93. Said pulses coincide in point of time with the positive half cycles of the bias voltage applied to the cathodes. Thus, the applied pulses counteract and neutralize the effect of the cathode biasing voltage. Therefore, in the presence of high frequency oscillations generated in the electronic amplifying and motor drive system and detected by the detector OD of Fig. 5, the vane controller oscillator TC then operates in its normal fashion. In the absence of said high frequency oscillations, however, the vane controller is made inoperative by A. C. bias voltage applied to the cathodes of the valves V and VA. Since the A. C. biasing voltage, which is about ten volts, is used to render the vane controller inoperative, it is necessary to make the amplitude of the high frequency oscillations high enough to counteract the effect of said bias voltage. High frequency oscillations of suitable amplitude are readily obtainable, however, with the positive feed back arrangement illustrated alike in Figs. 2 and 5 and hereinbefore described.

Figure 6:
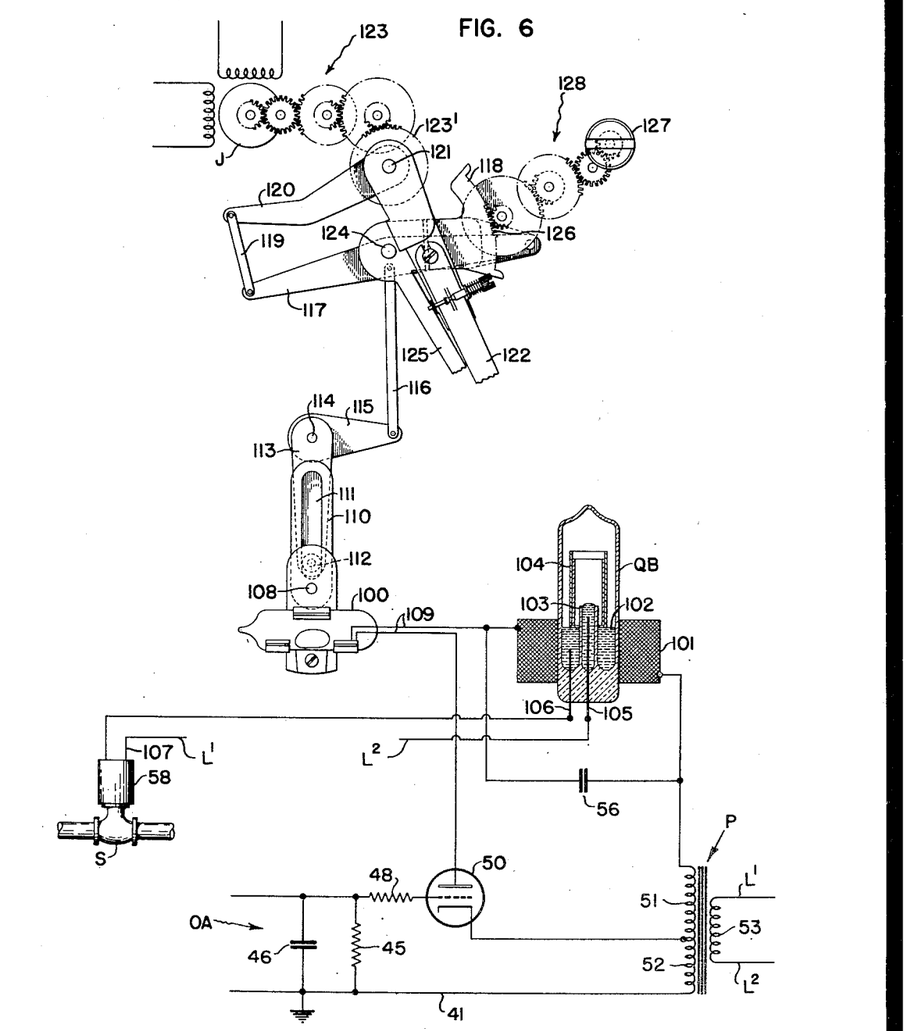
Fig. 6 is a diagram illustrating modifications in the apparatus shown collectively by Figs. 1 and 2.

The modified form of the invention illustrated in Fig. 6 includes a detector circuit OA arranged to control the energization of an electronic valve 50 associated with a power transformer P, as in Fig. 1, to provide current for energizing a relay circuit. That circuit includes the anode and cathode of the valve 50, secondary winding 51 of the transformer P, a mercury control switch 100 and the winding of an electromagnetic relay QB. The energization of the relay winding 101 effects the energization of the solenoid winding 58 of a valve S. The latter may be like the valve S shown in Figs. 1, 2, 3 and 4, and adapted to serve similar control purposes. The energization of the winding 101 of the relay QB is dependent on the operative condition of the circuit network controlling the operation of the motor J and upon the value of the quantity measured. This results from the fact that the valve 50 is operatively conductive only when the apparatus is sufficiently operative to create a high frequency current flow through the voltage amplifying and control system to which the detecting device OA is connected, and from the further fact that the switch 100 is automatically opened and closed as the value of the quantity measured rises to, and falls below, a predetermined control point value, as is hereinafter explained.

The relay QB is shown as an electromagnetic switch of well known commercial type comprising a vertical glass envelope. The latter is coaxial with and surrounded by the solenoid winding 101, and is partially filled by mercury 102. When the winding 101 is deenergized, the mercury is divided into two portions, one of which fills a vertical tube 103 formed of glass and axially disposed in the switch container and having its upper end open and its lower end closed. The remainder of the mercury 102 then surrounds the tubular part 103 with its upper level below the upper end of the tube 103. When the solenoid winding 101 is energized it sucks a tubular magnetic body 104 down into the annular body of mercury surrounding the tube 103. The volume of the tubular part 104 is large enough so that its depression raises the mercury level in the space surrounding the tube 103 above the top of the tube 103. In consequence, the mercury then extending over the upper edge or rim of the tube 103 forms a bridging conductor connection between the relay terminal 105 extending into the mercury in the lower portion of the tube 103, and the relay terminal 106 extending into the annular mass of mercury surrounding the lower portion of the tube 103. The subsequent deenergization of the winding 101 returns the mercury 102 to the condition shown in Fig. 6 and thus disconnects the terminals 105 and 106.

The relay terminal 105 is connected to the alternating current supply conductor $L^2$ and the relay terminal 106 is connected to one terminal of the solenoid 58 of the electromagnetic control valve S. The second terminal of the solenoid winding 58 is connected by the conductor 107 to the alternating current supply conductor $L'$. The energization of the relay thus effects the energization of the valve solenoid 58. The deenergization of the relay QB disconnects the terminals 105 and 106 and thus deenergizes the solenoid 58.

The mercury switch 100 is an on-off control element and operates to open and close the valve S accordingly as the mercury switch member 100 is tilted clockwise or counter clockwise about its axis 108.

The mercury switch 100 may be and is shown as a usual, commercially available type, comprising a glass container with a small body of mercury therein which is shifted to one end or the other of the container as the latter turns clockwise or counter clockwise about its supporting pivot 108 from the neutral position shown in Fig. 6. When the mercury switch container is turned clockwise, the mercury in the container passes to the lower right end of the container and connects the switch contacts 109 extending through the wall of the container. This closes the energizing circuit for the relay QB since the contacts 109 are included in that circuit. When the container is tilted counter clockwise so that the mercury moves out of the right end into the left end of the container, the connection between the switch contacts 109 is interrupted.

In the arrangement diagrammatically shown in Fig. 6, the clockwise and counter clockwise movements of the valve 100 result from rotative movements of the motor J like those through which the motor J adjusts the control lever M in Fig. 1. In Fig. 6, the supporting frame for the switch 100 pivoted at 108 includes a lever arm 110 which extends vertically upward above the pivot when the switch 100 is in its intermediate position shown in Fig. 6. The arm 110 is formed with a longitudinal slot 111 receiving a roller or pin 112 carried at the lower end of a crank arm 113 attached to a horizontal rock shaft 114. A second arm 115 secured to the shaft 114 is connected to the lower end of a link 116. The upper end of the link 116 forms part of a measuring and control mechanism of a well known and widely used type. Thus the upper end of the link 116 is pivotally connected to a floating lever 117 which has one end pivotally connected to a normally stationary, control point adjusting element 118. The other end of the lever 117 is connected by a link 119 to an arm 120 carried by a pen shaft 121. The pen shaft 121 carries and gives angular movement to the pen arm 122 of a recording instrument. As shown diagrammatically, the motor J angularly adjusts the pen shaft 121 through a speed reducing gear train 123 through which a gear carried by the shaft of the motor J rotates a gear or gear segment 123' secured to the pen shaft 121. The motor J of Fig. 6 may be given rotative movements as, and for the purposes for which, the motor J is given rotative movements in Fig. 1. The rotative movements of the motor J of Fig. 6 give rotative movements to the pen shaft 121 of Fig. 6 just as they give movements to the shaft $b$ in Fig. 1.

The adjustable fulcrum member 118 is, in effect, a gear segment pivoted to turn about a supporting shaft 124 adjacent and parallel to the pen shaft 121. Secured to the shaft 124 or directly to the member 118 is a control point index 125 which indicates on the record chart associated with the pen arm 122, the control point or value of the quantity measured which the control apparatus tends to maintain. The rotation of the shaft 124 to increase or decrease the control point value respectively raises or lowers the end of the lever 117 connected to the member 118 and thereby raises or lowers the link 116. The effect of the counter-clockwise adjustment of the member 118 is thus to increase the so-called "control point" value of the quantity measured. That increase increases the counter clockwise deflection of the pen arm 122 away from its zero position required to tilt the mercury switch into its open position.

The means shown in Fig. 6 through which up and down movements of the link 116 give tilting movements to the mercury switch 100, has the desirable characteristic of making the angular velocity of the switch relative to that of the rock shaft 114 relatively very high while the switch is being turned through the relatively short intermediate condition of its range of movement in which the mercury is displaced from one end to the other of the switch container. However, the apparatus shown in Fig. 6 through which the angular position of the mercury switch 100 is made jointly dependent on the angular positions of the pen shaft 121 and of the control point adjustment member 118, involves nothing claimed as novel herein, but is disclosed and claimed by Gregor W. Kuntny in his application, Serial No. 625,853, filed October 31, 1945.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Measuring apparatus comprising a circuit network including means responsive to variations in the value of a quantity being measured for creating a signal voltage, an electronic amplifying and control system having an input circuit on which said signal is applied and having an output circuit, means for transferring energy from one portion to another portion of said network thereby to maintain a relatively high frequency oscillating current flow in said network when said apparatus is fully operative but not when one or more predetermined defects therein exist, and control means, including a first means responsive to flow of said high frequency current in said network and a second means actuated by the signal voltage amplified in said system and cooperating with said first means to produce control effects in opposite directions on predetermined changes in the quantity measured during periods in which said high frequency current flow is being maintained and operating to create a control effect in one direction only when said high frequency current is interrupted.

2. Measuring apparatus comprising a circuit network including means responsive to variations in the value of a quantity being measured for creating a signal voltage, an electronic amplifying and control system having an input circuit on which said signal is applied and having an output circuit, means coupling said input and output circuits for the transfer of energy from said input circuit to said output circuit thereby to maintain a relatively high frequency oscillating current flow in said system when said apparatus is fully operative but not when one or more predetermined defects therein exist, and control means, including a first means connected to said output circuit and responsive to flow of said high frequency current in said system and a second means actuated by the amplified signal voltage and cooperating with said first means to produce control effects in one direction or in the opposite direction accordingly as the value of the quantity measured is or is not below a predetermined value during a period in which said high frequency current flow is being maintained and operating to create a control effect in said opposite direction only when said high frequency current is interrupted.

3. Measuring apparatus comprising a circuit network including means responsive to variations in the value of a quantity being measured for creating a signal voltage, an electronic amplifying and control system having an input circuit on which said signal is applied and having an output circuit, means for transferring energy from one portion to another portion of said network thereby to maintain a relatively high frequency oscillating current flow in said network when said apparatus is fully operative but not when one or more predetermined defects therein exist, a control element, means connected to said output circuit and responsive to an effect resulting from the amplification of said signal voltage to adjust said control element into different control positions, means connected to said output circuit and responsive to the flow of said high frequency oscillating current flow therein, and control means jointly controlled by said last mentioned means and by said control element and operative to produce different control effects dependent upon the position of said control element during periods in which said high frequency oscillating current is flowing in said output circuit, and to produce one only of said control effects during periods in which said high frequency current flow is interrupted.

4. Measuring apparatus comprising a circuit network including means responsive to variations in the value of a quantity being measured for creating a signal voltage, an electronic amplifying and control system having an input circuit on which said signal is applied and having an output circuit, means for transferring energy from one portion to another portion of said network thereby to maintain a relatively high frequency oscillating current flow in said network when said apparatus is fully operative but not when one or more predetermined defects therein exist, a control element, means connected to said output circuit and responsive to an effect resulting from the amplification of said signal voltage to adjust said control element between on control and off control positions, means connected to said output circuit and responsive to the flow of said high frequency oscillating current therein, and on-off control means jointly controlled by the last mentioned means and said control element and operative to produce a control effect when said control element is in its on control position and high frequency oscillating current is flowing in said output circuit, and to remove said control effect either when said control element is moved into its off control position or said high frequency oscillating current flow is interrupted.

5. Measuring apparatus comprising a circuit network including means responsive to variations in the value of a quantity being measured for creating a signal voltage, an electronic amplifying and control system having an input circuit on which said signal is applied and having an output circuit, means for transferring energy from one portion to another portion of said network thereby to maintain a relatively high frequency oscillating current flow in said network when said apparatus is fully operative but not when one or more predetermined defects therein exist, a control element having on control and off control positions, means responsive to an effect resulting from the amplification of said signal voltage to adjust said control element between on control and off control positions, an electronic valve having an anode, a cathode, and a control grid, a control circuit in which said anode and cathode are connected, means connecting said output and control circuits to maintain a relatively low frequency alternating current flow in said control circuit during periods in which said relatively high frequency current flow is flowing in said output circuit, means actuated by said control element to adjust said control circuit into and out of a condition in which the relatively low frequency current flow in the control circuit creates a high frequency oscillating current flow accordingly as said control element is in its off control or its on control positions, and on-off control means including a relay winding energized by the relatively low frequency current flowing in said control circuit during periods in which said high frequency oscillations are not created therein.

6. Self-balancing potentiometric measuring and control apparatus comprising a circuit network including a bridge circuit with a slidewire resistor, a slider contact engaging and movable along said resistor, a measuring circuit branch connected between said contact and a fixed point in said bridge circuit and including a source of voltage to be measured and a device for converting a unidirectional current flow in said branch into a relatively low frequency alternating current signal, a reversible motor having a control winding, an electronic amplifying and motor drive system having an input circuit including said device and amplifying said signal, and an output circuit including said control winding, means coupling said input and output circuits for transferring energy from said input circuit to said output circuit and thereby producing a relatively high frequency current flow in said system when the latter is in normal operative condition, a control element, a mechanical connection between said element and said slider contact arranged to adjust said element into different control positions as said slider contact is adjusted into different positions corresponding to different values of said voltage, means connected to said output circuit and responsive to the flow of said high frequency current therein, and control means jointly controlled by the last mentioned means and by said control element and operative to produce control effects dependent on the position of said control element during periods in which said high frequency current is flowing in said output circuit, and to produce one only of said control effects during periods in which said high frequency current flow is interrupted.

7. Self-balancing potentiometric measuring and control apparatus comprising a circuit network including a bridge circuit with a slide-wire resistor, a slider contact engaging and movable along said resistor, a measuring circuit branch connected between said contact and a fixed point in said bridge circuit and including a source of voltage to be measured and a device for converting a unidirectional current flow in said branch into a relatively low frequency alternating current signal, a reversible motor having a control winding, an electronic amplifying and motor drive system having an input circuit including said device and amplifying said signal, and having an output circuit including said control winding, means coupling said input and output circuits for transferring energy from said input circuit to said output circuit and thereby producing a relatively high frequency current flow in said system when the latter is in normal operative condition, a control element, a mechanical connection between said element and said slider contact arranged to adjust said element between on control and off control positions when said slider contact is adjusted between a predetermined normal value position and a lower value position, means connected to said output circuit and responsive to the flow of said high frequency current therein, and on-off control means jointly controlled by the last mentioned means and said control element and operative to produce a control effect when said control element is in its on control position and high frequency current is flowing in said output circuit, and to remove said control effect either when said element is moved into its off control position or said high frequency current flow is interrupted.

8. Self-balancing potentiometric measuring and control apparatus comprising a circuit network including a bridge circuit with a slide-wire resistor, a slider contact engaging and movable along said resistor, a measuring circuit branch connected between said contact and a fixed point in said bridge circuit and including a source of voltage to be measured and a device for converting a unidirectional current flow in said branch into a relatively low frequency alternating current signal, a reversible motor having a control winding, an electronic amplifying and motor drive system having an input circuit including said device and amplifying said signal, and an output circuit including said control winding, means coupling said input and output circuits for transferring energy from said input circuit to said output circuit and thereby producing a relatively high frequency current flow in said system when the latter is in normal operative condition, a control element, a mechanical connection between said element and said slider contact arranged to adjust said element between on control and off control positions when said slider contact is adjusted between a predetermined normal value position and a lower value position, an electronic valve having an anode, a cathode and a control grid, a fourth circuit in which said anode and cathode are connected, means connecting said output and fourth circuits to maintain a relatively low frequency alternating current flow in said fourth circuit during periods in which said relatively high frequency current flow is flowing in said output circuit, means actuated by said control element to adjust said fourth circuit into and out of a condition in which the relatively low frequency current flow in the fourth circuit creates a high frequency oscillating current flow accordingly as said control element is in its off control or its on control position, and on-off control means including a relay winding energized by the relatively low frequency current flowing in said fourth circuit during periods in which said high frequency oscillations are not created therein.

9. Apparatus as specified in claim 8, in which said fourth circuit includes two associated coils one of which is connected to said anode while the second coil is connected to said cathode and in which an induction shield is associated with said coils and is mechanically connected to said control element for adjustment between one position in which the mutual inductance of said coils is sufficient to produce high frequency oscillations in said fourth circuit, and a second position in which the mutual inductance of said coils is reduced by said vane sufficiently to prevent said oscillations accordingly as said control element is in its off control position or its on control position.

10. Apparatus as specified in claim 8, including a power transformer having its primary winding connected to a source of alternating current of relatively low frequency and having a secondary winding supplying said relatively low frequency alternating current to said fourth circuit.

11. Apparatus as specified in claim 8, including a power transformer having its primary winding connected to a source of alternating current of relatively low frequency, and having a secondary winding supplying said relatively low frequency alternating current to said fourth circuit and including a switch controlled by the means connecting said output and fourth circuits to close or open said fourth circuit accordingly as said relatively high frequency alternating current is or is not flowing in said output circuit.

12. Apparatus as specified in claim 8, including a power transformer having its primary winding connected to a source of alternating current of relatively low frequency, and having a secondary winding supplying said relatively low frequency alternating current to said fourth circuit, and in which one terminal of said secondary winding is connected to ground and in which the control grid of said valve is connected substantially directly to ground for high frequency current flow and in which said cathode is connected to ground by a connection having small resistance to direct current flow.

13. Apparatus as specified in claim 8, in which said fourth circuit includes a second electronic valve having its anode and cathode connected in parallel with the anode and cathode of the first mentioned valve and arranged to operate without producing high frequency oscillations under any operative condition to which said fourth circuit is normally subjected, and in which said relay winding is connected in series with the anode and cathode of each valve.

14. Apparatus as specified in claim 9, in which a source of relatively low frequency alternating current is connected in series with said second coil between said cathode and ground.

15. Apparatus as specified in claim 1, in which said coupling means comprises a transformer with a core including a wire subjected to torsional stress, and with two secondary winding sections, one surrounding one and the other surrounding the second of two longitudinally displaced sections of the wire, and in which the adjustment of said control element between its on and off positions increases the torsional stress of one of said wire sections relative to the torsional stress in the other of said wire sections.

16. Apparatus as specified in claim 6, in which said control element is operatively connected to said coupling means to make the latter operative or inoperative accordingly as said control element is in its off position or in its on position, respectively.

17. Apparatus as specified in claim 6, in which said coupling means comprises a transformer having a core and primary and secondary windings thereon and means for varying the permeability of a portion of said core.

18. Apparatus as specified in claim 7, comprising a fourth circuit including an electronic valve connected to the said output circuit of said amplifying and motor drive system by the means responsive to the relatively high frequency current flow in said output circuit for the maintenance in said fourth circuit of a relatively low frequency alternating current flow during periods in which said relatively high frequency current is flowing in said output circuit, fourth circuit adjusting means actuated by said control element to cause high frequency oscillations in said fourth circuit during those portions of said periods in which said element is in its off control position, and control means including a relay winding in said fourth circuit which is operatively energized by the said relatively low frequency current flowing in said fourth circuit during the portions of said periods in which said control element is in its on control position.

RUDOLF F. WILD.

REFERENCES CITED

The following references are of record in the file of this patent:

UNITED STATES PATENTS

| Number | Name | Date |
|---|---|---|
| 2,256,304 | Wills | Sept. 16, 1941 |
| 2,313,711 | Harrison | Mar. 2, 1943 |
| 2,423,478 | Busse et al. | July 8, 1947 |